United States Patent [19]

Zipay et al.

[11] 4,123,237
[45] Oct. 31, 1978

[54] LOW PRESSURE DROP GIRTH BAFFLE STEAM SEPARATOR

[75] Inventors: Albert J. Zipay, Clifton; Walter P. Gorzegno, Morristown, both of N.J.

[73] Assignee: Foster Wheeler Energy Corporation, Livingston, N.J.

[21] Appl. No.: 781,392

[22] Filed: Mar. 25, 1977

[51] Int. Cl.² .................. B01D 19/00; B01D 53/24
[52] U.S. Cl. ........................... 55/205; 55/349; 55/392; 55/434; 122/491
[58] Field of Search ............... 55/185, 186, 187, 188, 55/192, 193, 201, 202, 204, 434, 205, 349, 392; 122/491

[56] References Cited

U.S. PATENT DOCUMENTS

| | | | |
|---|---|---|---|
| 2,151,863 | 3/1939 | Millard | 55/185 |
| 2,264,248 | 11/1941 | Schrader | 55/392 X |
| 2,321,628 | 6/1943 | Rowand et al. | 55/205 |
| 2,675,888 | 4/1954 | Blizard et al. | 122/491 |
| 3,077,714 | 2/1963 | McIlvaine | 55/434 X |
| 3,164,445 | 1/1965 | Hampel | 55/434 X |
| 3,316,692 | 5/1967 | Hughes et al. | 55/204 |
| 3,450,106 | 6/1969 | Nelken | 55/349 X |
| 3,771,290 | 11/1973 | Stethem | 55/205 |
| 4,019,881 | 4/1977 | Herzog et al. | 55/185 |

Primary Examiner—Robert H. Spitzer
Attorney, Agent, or Firm—Marvin A. Naigur; John E. Wilson; John J. Herguth, Jr.

[57] ABSTRACT

A separator for separating water from a mixture of water and steam in which an elongated, outer, water scroll is concentrically spaced from an elongated, inner, steam scroll. One longitudinal edge of each scroll is connected to a girth baffle disposed adjacent the side of a steam drum, and both scrolls extend through semi-circular curves of 180° in cross section. The steam scroll is covered through the first 90° of its curve, and is provided with a longitudinally-elongated opening extending circumferentially the second 90° of its curve. A perforated plate encloses the bottom of the steam scroll to form a longitudinal flow passage. The centrifugal action imparted by the 180° curvature of the separator causes the water to sepate from the steam-water mixture introduced between the steam and water scrolls, to flow along the inner surface of the water scroll, and to discharge downwardly through perforated, water splash diffuser plates. The steam passes through the elongated opening in the steam scroll and through the longitudinal flow passage to discharge from the separator at both ends.

17 Claims, 5 Drawing Figures

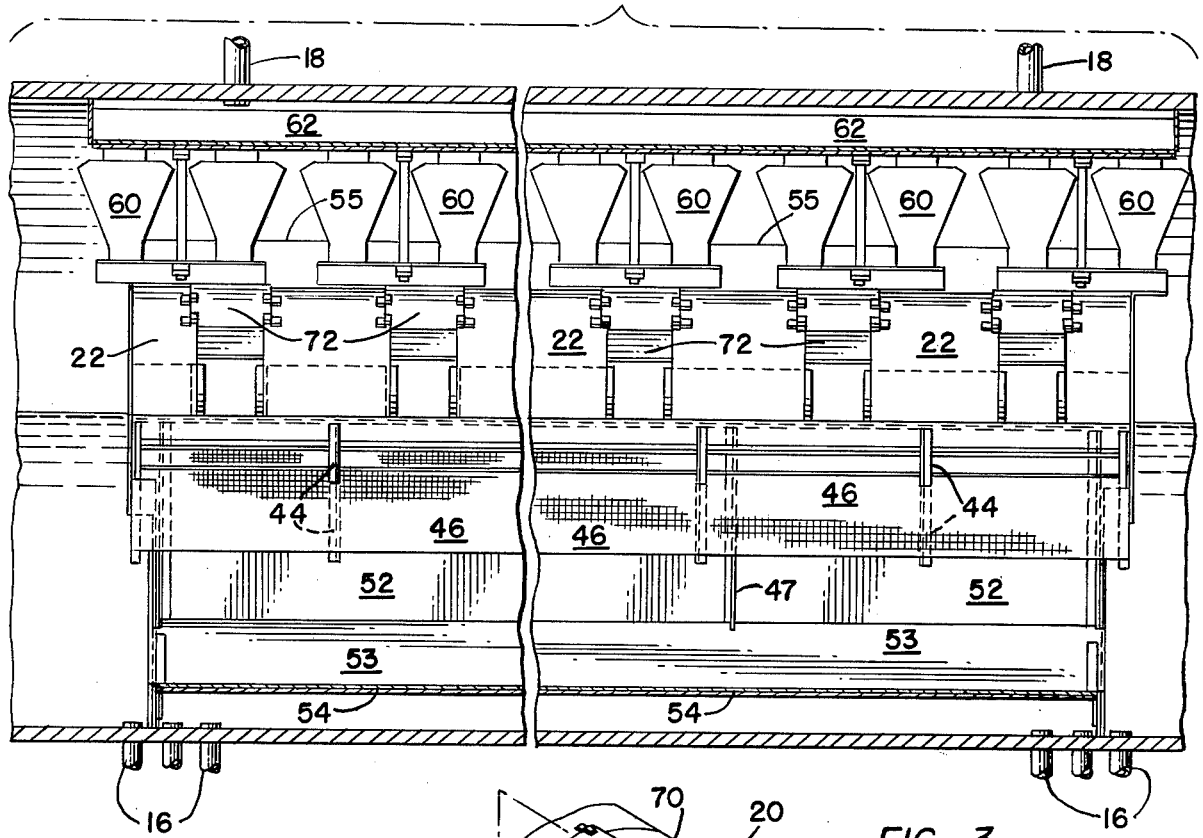
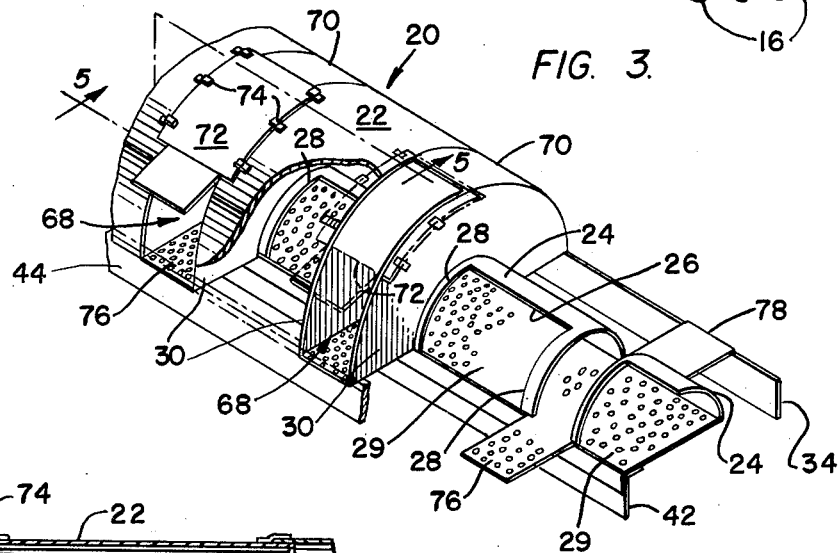
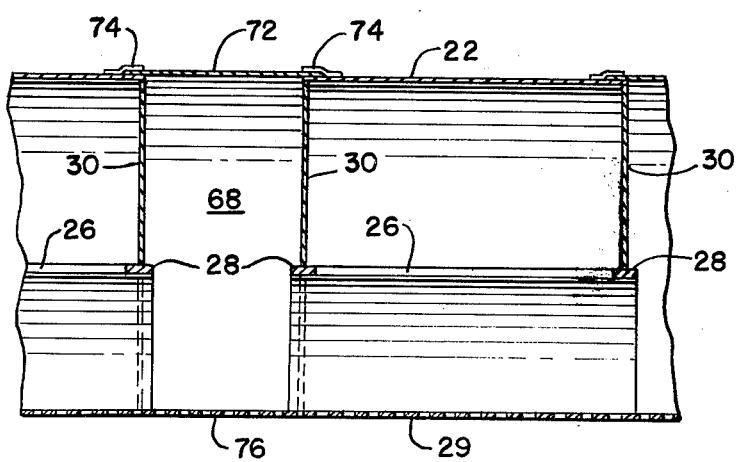

LOW PRESSURE DROP GIRTH BAFFLE STEAM SEPARATOR

BACKGROUND OF THE INVENTION

This invention relates generally to the separation of fluids from mixtures thereof and, more particularly, to the separation of vapor and liquid from mixtures of the same.

In natural-circulation vapor generators, mixtures of steam and water rise in heated, steam-generating tubes and discharge into one or more large steam drums disposed above the tubes, with the separation of water from steam occurring in separators within the drum. The separated steam is removed through openings in the upper portion of the drum, while the water remaining in the drum is recirculated through downcomers, through the boiler and back to the steam-generating tubes.

Trouble-free operation of a natural-circulation vapor generator requires efficient separation of steam and water and an adequate and properly-distributed supply of water through the steam-generating tubes. The separator, accordingly, has two essential functions, one of which is the separation of water from steam to provide the downcomers with the steam-free water necessary for proper operation of the circulation system of the vapor generator. The other function is the separation of moisture from the steam to provide high-purity steam.

The pressure drop of the circulating fluid through the separator is an important consideration in that this loss must be minimized to maintain proper circulation in the system. Low pressure industrial boilers of present day design are, in general, more highly rated, and efficient separation in the drum, with minimal pressure loss, is essential to furnish steam of the required purity to the point of use and steam-free water to the circulation system. In the circulation of the steam-water mixture through the steam drums and through the steam-water separators located within these drums, the steam-water mixture is generally introduced into a receiving chamber within the steam drum, and through a plurality of inlets into one or more separators. The expansion of the mixture through the separator inlets results in a substantial pressure drop, which if too large can adversely affect the circulation system. Also, at low pressure the steam specific volume is high, and a centrifugal separator for this application must have sufficient flow area to minimize pressure loss and still achieve separation.

Some separators of the prior art have generally been of complicated, S-shaped structures which are expensive and difficult to fabricate. Additionally, the convoluted passages through which the steam-water mixture must flow present another source of pressure loss.

SUMMARY OF THE INVENTION

It is, therefore, an object of the present invention to provide an improved fluid separator for mixtures of a liquid and vapor which produces a relatively low pressure loss in the flow of the mixtures through the separator.

Another object of the present invention is to provide a liquid-vapor separator which is particularly adapted for use in separating water from a steam-water mixture.

Another object of the present invention is to provide an improved steam-water separator of simple, efficient and inexpensive design.

Still another object of the present invention is to provide an improved steam-water separator in which the structural components have simple, semi-cylindrical shapes.

A further object of the present invention is to provide an improved steam-water separator having relatively large flow passages to reduce pressure loss of the steam-water mixture flowing therethrough.

Yet a further object of the present invention is to provide an improved steam-water separator particularly adapted for use in a steam drum to remove the water from a steam-water mixture.

Still a further object of the present invention is to provide a steam-water separator which is compatible with the girth baffle of a steam drum.

Toward the fullfilment of these and other objects, the steam-water separator of the present invention is designed to be an integral extension of the girth baffle of a steam drum and has two, substantially semi-cylindrical elements concentrically separated to provide a curved flow path of approximately 180° for the steam-water mixture. The outer, semi-cylindrical water scroll extends 180° and is attached at one edge to a portion of the girth baffle. The inner, steam scroll has a semi-cylindrical surface that is solid for 90° of its curvature, with the remaining 90° having a longitudinally-elongated, notched, portion being removed. The steam-water mixture introduced into the receiving chamber defined by the girth baffle is conducted between the water and the steam scrolls, and centrifugal force causes the water to separate and flow along the inner surface of the water scroll to be subsequently discharged through a perforated, water splash plate. The lighter-density steam flows around the solid, 90° quarter-cylindrical surface of the steam scroll and into the longitudinal flow passage defined by the elongated cut-out on the second 90° portion of the steam scroll, to be discharged from the ends of the separator. The semi-cylindrical shape of the scrolls results in a simplier configuration which is cheaper and easier to fabricate, and the relatively large flow passages within the water-steam separator result in a lower pressure drop as the mixture flows through the separator.

BRIEF DESCRIPTION OF THE DRAWINGS

The above description, as well as further objects, features, and advantages of the present invention, will be more fully appreciated by reference to the following description of a presently preferred but nonetheless illustrative embodiment in accordance with the present invention, when taken in connection with the accompanying drawings, wherein:

FIG. 3 is a pictorial view, partially in section, of a plurality of the separators of the present invention, showing more details of the construction thereof;

FIG. 4 is a partially-sectioned, elevational view along line 4—4 of FIG. 2, showing the steam drum with a plurality of the steam-water separators of the present invention; and FIG. 5 is a view of the installation along line 5—5 of FIG. 3.

DESCRIPTION OF THE PREFERRED EMBODIMENT

Figure 1:
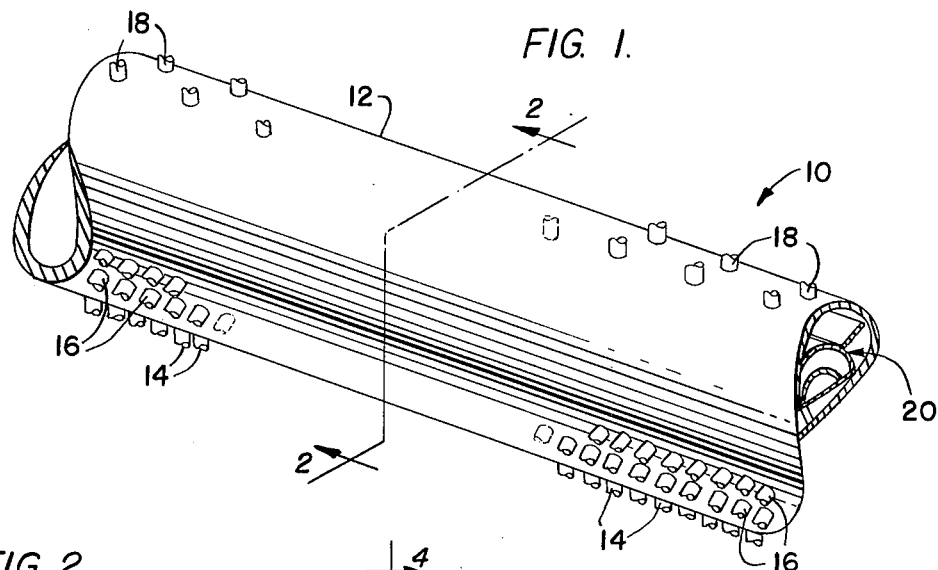
FIG. 1 is a pictorial perspective of a steam drum incorporating the steam-water separator of the present invention.

Referring now to the drawings, and more particularly to FIG. 1 thereof, the reference numeral 10 refers in general to a steam drum, which may be incorporated within a heat transfer apparatus, such as a natural-circulation vapor generating system, in which separators effect the separation of water from a mixture of steam and water. The steam drum 10 is generally of an elongated shape with a cylindrical wall 12. Banks of steam-generating tubes 14 are connected at their upper ends to a mixture-receiving chamber disposed at the lower portion of the steam drum 10, and a plurality of downcomers 16 extend from the steam drum to return the separated water, mixed with a quantity of feed water, to a boiler (not shown), wherein the water is heated and recycled through the steam drum. Dried steam is removed from the steam drum 10 through a plurality of steam conduits 18. A plurality of separators 20 are provided in the steam drum 10, with one being visible at the right end of the steam drum as viewed in FIG. 1.

Figure 2:
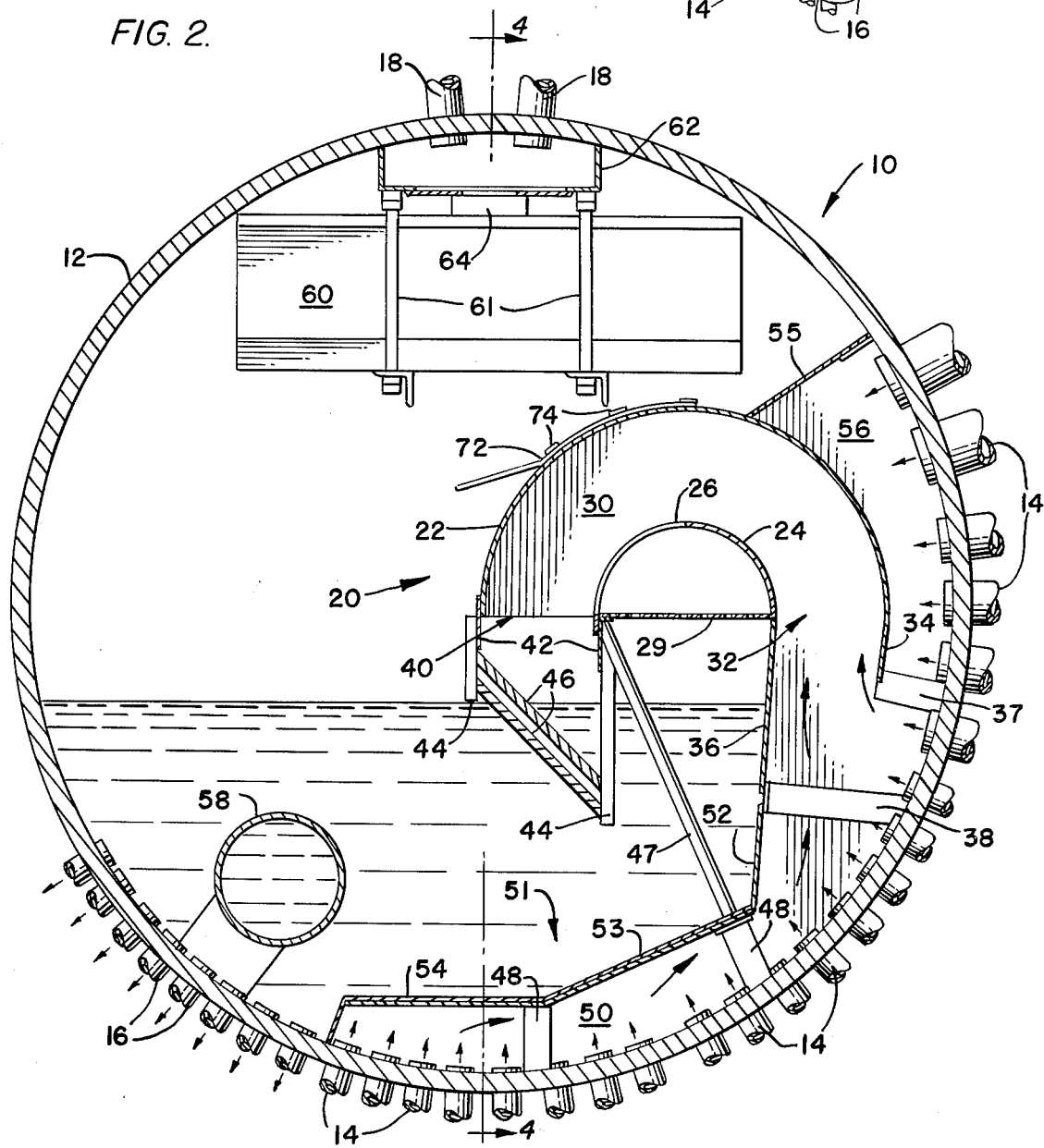
FIG. 2 is a cross section of the steam drum along line 2—2 of FIG. 1.

Referring to FIGS. 2 and 3, each separator 20 includes a generally elongated, semi-cylindrical, outer shell 22, commonly called a water scroll, disposed in a concentric, spaced relationship to an inner, elongated, semi-cylindrical shell 24, or a steam scroll, to define a steam-water flow passage therebetween. The water scroll 22 has a solid surface which extends for 180° of its curvature, while the steam scroll 24 has a solid, quarter-cylindrical surface extending for approximately 90° of its curvature. The remaining 90° of the surface of the steam scroll 24 is removed, as indicated by the cutout 26, with the exception of a short-length, curved portion 28 (FIG. 3) at both ends of the scroll. A horizontally-extending, perforated plate 29 joins both lateral edges of the steam scroll 24 to form a longitudinal flow passage for the separated steam.

The particular configuration of the water scroll 22 and the steam scroll 24 may be seen more clearly in FIG. 3, which shows a plurality of longitudinally-aligned separators 20, with the water scroll of the separators on the right end of the figure removed for clarity of presentation. In particular, the cutout 26 of the steam scroll 24 extends circumferentially from substantially the vertical, 90° position of the steam scroll to the very edge thereof, and extends longitudinally for substantially the length of the separator 20, to the curved portions 28 at both ends. By way of illustrative example only, the steam scroll 24 may be conveniently fabricated from one half of a 12-inch standard pipe of the appropriate length, with a portion of the second quarter-cylindrical surface of the pipe removed to provide the cutout 26 and the end portions 28. The perforated plate 29, which has a width equal to the diameter of the pipe from which the steam scroll 24 is fabricated, is then attached to the free edges of the pipe by any suitable means, such as by welding or the like.

Each separator 20 extends longitudinally a predetermined length, with the ends of the separator being closed by side plates 30 that cover the annulus formed by the water and steam scrolls 22 and 24, respectively. When a plurality of separators 20 are longitudinally arranged, as shown in FIGS. 3-5, adjacent, longitudinally-disposed separators are spaced apart to provide a passage for the separated steam, as will be described more fully below.

The water scroll 22 and the steam scroll 24 are connected at their right edges, as viewed in FIG. 2, to internal structure of the steam drum 10 in a manner to be described later, to form an inlet 32 through which the steam-water mixture is introduced into the separator 20. More specifically, the inlet 32 of the separator 20 is formed by a front baffle plate 34 and a rear baffle plate 36, which extends downwardly from the longitudinal edge of the water scroll 22 and the steam scroll 24, respectively. The plates 34 and 36 extend for the entire length of the drum 10, are supported at their respective lower ends from the wall 12 of the steam drum 10 by baffle support lugs 37 and 38, and form a portion of the girth baffle structure which is described more fully below. The inlet 32 is thus tangentially disposed relative to the water and steam scrolls 22 and 24, respectively.

An outlet 40 for the separator 20 is defined by the other longitudinal edges of the water scroll 22 and the steam scroll 24. Attached tangentially to the outlet edges of the water and steam scrolls 22 and 24, respectively, are a pair of vertically-extending, water splash hangar plates 42. Attached to the water splash hangar plates 42 are a pair of unequal-length, downwardly-extending, support angles 44, between which are suspended multiple perforated, water splash plates or expanded metal lathe 46, which are disposed at an angle relative to the outlet edges of the water and steam scrolls 22 and 24, respectively, such as at an angle of approximately 45° relative to the support angles 44. One end of a support angle 47 is attached to one of the water splash plate hangers 42, with the other end attached to a baffle support lug 48 to provide the necessary support for the outlet 40 of the separator 20.

A chamber 50 is provided to receive the steam-water mixture from the steam-generating tubes 14, and is defined on one side by the inner surface of wall 12 of the steam drum 10, through which the tubes extend, and on the other side by a girth baffle, shown in general by the reference numeral 51. The girth baffle 51 is formed by the aforesaid front and rear baffle plates 34 and 36, respectively, a vertical, lower baffle plate 52 attached at one edge to the rear baffle plate 36, an inclined lower baffle plate 53, and a deflector plate 54, all of which are appropriately supported and spaced a predetermined distance from the wall by a plurality of baffle support lugs 48. An upper baffle plate 55, disposed adjacent to the water scroll 22, cooperates with a pair of radially-extending baffle end plates 56 (one shown in FIG. 2) disposed near the ends of the drum 10 to enclose the chamber 50 and complete the structure of the girth baffle 51. The girth baffle 51, and consequently the receiving chamber 50, extend the entire length of the plurality of separators 20, as shown in FIG. 4 and discussed more fully below.

Referring again to FIG. 2, a longitudinally-extending water feed pipe 58 maintains a relatively constant level of water within the drum to supply water to the boiler (not shown) via the downcomers 16. The steam drum 10 is thus divided into a lower, water space and an upper, vapor space, with the separators 20 disposed generally in the vapor space. The girth baffle separates the steam-water mixture chamber 50 from the water space, and may be provided with suitable fluid seals.

Also disposed within the drum 10 in the vapor space above the separators 20 are a plurality of steam dryers 60 (FIGS. 2 and 4), which extend transversely of the drum and in spaced relationship from the inner peripheral surface of the drum, and extend longitudinally a distance beyond the separators. The steam dryers 60 are supported by support members 61, which are attached at their upper ends to the lower surface of a dry box 62. The longitudinally-extending dry box 62, attached to the wall 12 of the drum 10 at the upper portion thereof, is in communication with each of the dryers 60 through an inter-connecting nozzle 64. Dried steam is conducted from the dry box 62 through a plurality of conduits 18 extending from the upper surface of the steam drum 10.

As shown in FIG. 4, the dryers 60 may be V-shaped in cross section, with each leg of the V having a plurality of W-shaped plates (not shown) inserted therein in a nested but spaced relationship, and may be of the chevron type disclosed in U.S. Pat. No. 2,472,101, issued on June 7, 1949. Remaining entrained water particles carried over with the steam from the separators 20 are separated therefrom as the separated steam flows through the space between the nested plates.

As noted from FIGS. 3–5, a plurality of the separators 20 are disposed longitudinally along the length of the steam drum 10, with each separator 20, as defined between successive side plates 30, being spaced from the next, longitudinally-disposed separator to provide a steam passage 68 between adjacent separators. The curved, end portions 28 of the steam scrolls 24 extend beyond the side plates 30 of the separators 20 to conduct the steam into the steam passages 68. Each steam passage 68 is enclosed on its back side (relative to the orientation of FIG. 3) by a steam scroll plate 70, which extends circumferentially for approximately 90° of the semi-cylindrical curvature of the separator structure, with the front portion of the steam passage being partially covered by an intermediate closure plate 72 removably attached to the edges of the adjoining separator structure by a plurality of retaining clips 74. The forward portion of the intermediate closure plate 72 is directed upwardly with respect to a tangent to the curvature of the water scroll 22, at an angle of about 30°. The intermediate enclosure plate 72 may be conveniently fabricated from a single sheet of plate material, with a tongue portion on a leading edge having a narrower width than the rest of the plate and being bent upwardly at the aforesaid 30° orientation.

It can be seen from FIG. 3 that the steam passage 68 between adjoining separators 20 is provided with a horizontally-extending, perforated cover plate 76, similar in structure to the perforated plate 29 provided in the steam scroll 24. The cover plate 76 extends from the inlet edge of the steam scroll 24 forwardly to the outlet edge of the water scroll 22. The remaining horizontal gap at the back portion of the steam passage 68, from the inlet edge of the steam scroll 24 to the inlet edge of the water scroll 22, is covered by a steam seal plate 78. If desired, the cover plate 76 and the perforated plate 29 may be cut simultaneously to the appropriate shape from the same sheet of material, and be of suitable length to extend longitudinally beneath the plurality of separators 20. The perforations in the plates 29 and 76 permit excess water in the separated steam to be drained to the water space in the drum 10.

In operation, the steam-water mixture is introduced into the receiving chamber 50 by the bank of steam-generating tubes 14, which are in fluid communication with the chamber at the upper ends thereof. From the receiving chamber 50, the steam-water mixture is directed tangentially into each of the separators 20 through the inlet 32 between the inner, steam scroll 24 and the outer, water scroll 22 to impinge upon the inner surface of the water scroll. Under the centrifugal action imparted by the combination of the pressure of the mixture and the 180° curvature of the water scroll 22, the more dense water is separated from the mixture and collects on the inner surface of the water scroll. The separated water is discharged through the outlet 40, vertically downwardly through multiple inclined, perforated water splash plates 46, which dissipate the velocity of the water. With the separation of the water, the lower-density steam flows around the outside of the inner, steam scroll 24, and after the steam has passed the covered 90° portion of the steam scroll, it abruptly turns downwardly and flows through the cutout 26 in the steam scroll. From the cutout 26 the steam flows longitudinally in both directions toward the steam passages 68 connecting adjoining separators 20. From each of the steam passages 68, the steam is then discharged upwardly toward the chevron dryers 60, wherein any remaining, entrained water is separated from the steam. The resulting dry steam is collected within the dry box 62 and is removed through the plurality of conduits 18 to a superheater or to the ultimate user of the steam.

In the separator of the present invention, use of semi-cylindrical shapes for the steam and water scrolls, which are positioned to be extensions of the girth baffle within the steam drum, provides for a simple and economic design. The use of commercially-available, plate material for the other components of the separator further minimizes fabrication cost, and the provision of large flow passages which do not have any extraneous flow-disturbing elements minimizes the pressure drop of the steam and water as it flows through the separator.

It is understood that the necessary number of separators and chevron dryers would be installed within the steam drum commensurate with the operational requirements of the vapor generator and the dimensional capabilities of the installation. While not specifically illustrated in the drawings nor described in detail, it is understood that all of the necessary equipment and components would be provided and incorporated into the presently-disclosed steam-water separator to render it operative as described, such as pumps, piping, heat source, etc., which are known in the art. Further, it is understood that all of the components described above are arranged and supported in an appropriate fashion to form a complete, operative system.

Of course variation of the specific construction and arrangement of the steam-water separator disclosed above can be made by those skilled in the art without departing from the invention as defined in the appended claims.

We claim:

1. A vapor and liquid separator for separating vapor and liquid from a mixture thereof, comprising:
   a semi-cylindrical, inner member having a cut-out disposed on a portion of the curved surface;
   a semi-cylindrical, outer member concentrically positioned with respect to said inner member to define a curved separation chamber between said inner and said outer members;
   an inlet flow passage disposed tangentially with respect to said inner and outer members for the introduction of a mixture of vapor and liquid into said separation chamber;
   a plate joining the edges of said inner member to form a flow passage for the separated vapor;
   an outlet flow passage directed tangentially with respect to said inner and outer members for the discharge of separated liquid from said separation chamber; and a perforated member disposed across said outlet flow passage to dissipate the flow velocity of the separated liquid, whereby the mixture of vapor and liquid introduced into said inlet flow passage impinges upon the inner surface of said outer member, and centrifugal force causes the liquid to separate from the vapor, with the liquid collecting on the inner surface of said outer member and being discharged through said outlet flow passage, and the vapor being discharged through said cutout in said inner member.

2. A vapor and liquid separator as defined in claim 1, further comprising a plurality of perforated members, each of said members being disposed across and inclined at an angle relative to the horizontal plane of said outlet flow passage.

3. A vapor and liquid separator as defined in claim 1, wherein said inner member extends longitudinally beyond the ends of said outer member to conduct the separated vapor from said longitudinal flow passage.

4. A vapor and liquid separator as defined in claim 1, wherein said inner member comprises half of a cylindrical conduit.

5. A vapor and liquid separator as defined in claim 1, wherein said outlet flow passage is disposed substantially 180° from said inlet flow passage.

6. In combination with a vapor and liquid drum of a vapor generator, said drum having a chamber disposed adjacent one side of the drum for receiving a vapor and liquid mixture, a separator for separating vapor and liquid from the mixture, said separator comprising:

a semi-cylindrical, inner member having a longitudinal cutout disposed on a portion of the curved surface;

a semi-cylindrical, outer member concentrically disposed with respect to said inner member to define a curved separation chamber between said inner and said outer members;

an inlet flow passage extending from said receiving chamber and disposed tangentially with respect to said inner and outer members for introduction of the mixture from said receiving chamber to said separation chamber; and an outlet flow passage directed tangentially with respect to said inner and outer members for the discharge of separated liquid from said separation chamber, said mixture being introduced into said inlet passage and impinging upon the inner surface of said outer member, and centrifugal force causing the liquid to separate from the vapor, said liquid collecting on the inner surface of said outer member and discharging through said outlet passage, and the vapor being discharged through said cutout in said inner member.

7. The combination of claim 6, further comprising:

a perforated plate joining the edges of said inner member to form a longitudinal vapor flow passage, the separated vapor being discharged from said cutout through said flow passage; and perforated means disposed across said outlet to dissipate the flow velocity of the separated liquid.

8. The combination of claim 7, wherein said perforated means comprises a plurality of perforated members, each of said members being disposed across and at an angle relative to the horizontal plane of said outlet flow passage.

9. The combination of claim 7, further comprising:

a plurality of said separators disposed longitudinally adjacent the side of said drum and in fluid communication with said receiving chamber, each of said separators having members at the longitudinal ends thereof to close said separation chamber, and each of said separators being longitudinally spaced from each other to define a transverse vapor passage between separators which communicates with said longitudinal vapor passages for discharging the separated vapor from said longitudinal vapor flow passages and said separators;

arcuate closure means covering a portion of each of said transverse vapor passages; and a second perforated member extending horizontally in each of said transverse vapor passages for the discharge of excess liquid from the separated vapor.

10. The combination of claim 9, wherein the end portions of each of said inner members extend into said transverse vapor passage to conduct the separated vapor from said longitudinal vapor flow passage and each of said arcuate closure means is provided with a portion directed upwardly relative to the horizontal plane for conducting the separated vapor upwardly from each of said transverse vapor passages.

11. The combination of claim 9, further comprising:

dryer means to further remove entrained liquid from the separated vapor;

means for removing the dried vapor from said drum; and liquid supply means to maintain a predetermined level of liquid in said drum.

12. The combination of claim 6, wherein said inner member extends longitudinally beyond the ends of said outer member and has a solid, curved surface extending circumferentially for substantially 90°, said solid curved surface being disposed adjacent to said inlet flow passage.

13. The combination of claim 12, wherein said inner member comprises one half of an elongated cylindrical pipe, and said cutout extends circumferentially for the remaining portion of the semi-cylindrical surface.

14. The combination of claim 13, wherein said cutout extends substantially the length of said inner member, except for a solid surface portion at both ends.

15. The combination of claim 6, wherein said outlet flow passage is disposed substantially 180° from said inlet flow passage.

16. A vapor and liquid separator for separating vapor and liquid from a mixture thereof, comprising:

a semi-cylindrical, inner member having a solid, curved surface extending circumferentially for substantially 90° of its semi-cylindrical curvature and a cut-out extending circumferentially the remaining portion of the semi-cylindrical curvature;

a semi-cylindrical, outer member concentrically positioned with respect to said inner member to define a curved separation chamber between said inner and said outer members;

an inlet flow passage disposed tangentially with respect to said inner and outer members for the introduction of a mixture of vapor and liquid into said separation chamber; and an outlet flow passage directed tangentially with respect to said inner and outer members for the discharge of separated liquid from said separation chamber, whereby the mixture of vapor and liquid introduced into said inlet flow passage impinges upon the inner surface of said outer member, and centrifugal force causes the liquid to separate from the vapor, with the liquid collecting on the inner surface of said outer member and being discharged through said outlet flow passage, and the vapor being discharged through said cut-out in said inner member.

17. A vapor and liquid separator as defined in claim 16, wherein said outer member has a solid surface extending circumferentially for substantially 180° of its semi-cylindrical curvature, and said solid surface of said inner member is disposed adjacent to said inlet flow passage.

* * * * *